No. Patent Number: 4,660,042
Date of Patent: Apr. 21, 1987

United States Patent [19]
Ekstrom

[54] CANCELLATION SYSTEM FOR TRANSMITTER INTERFERENCE WITH NEARBY RECEIVER

[75] Inventor: Joel L. Ekstrom, McLean, Va.

[73] Assignee: Litton Systems, Inc.

[21] Appl. No.: 583,196

[22] Filed: Feb. 24, 1984

[51] Int. Cl.$^4$ ............................ G01S 7/42; H04B 1/48
[52] U.S. Cl. .................................... 342/175; 342/194; 342/13; 455/79
[58] Field of Search ............... 343/5 NQ, 18 E, 5 PN, 343/17.2 R, 17.5 R; 455/296, 50, 78, 79, 303, 304, 295, 80, 81, 82; 342/175, 194

[56] References Cited

U.S. PATENT DOCUMENTS

| 3,021,521 | 2/1962 | Hutchins | 342/175 |
| 3,699,444 | 10/1972 | Ghose et al. | 455/304 X |
| 3,810,182 | 5/1974 | White et al. | 455/79 |
| 4,064,511 | 12/1977 | Manfanovsky | 342/194 X |
| 4,423,505 | 12/1983 | Greig | 455/79 X |
| 4,475,243 | 10/1984 | Batlivala et al. | 455/78 X |

Primary Examiner—T. H. Tubbesing
Assistant Examiner—Gilberto Barrón, Jr.
Attorney, Agent, or Firm—Robert F. Rotella

[57] ABSTRACT

Interference from frequency modulated transmitter signals, such as radar jamming signals, is cancelled in a nearby receiver by orthogonally related cancellation signals derived from the transmitter signal. The cancellation signals are controlled or modulated by corresponding cancellation modulation signals derived from the transmitter frequency modulation signal superposed on weighting signals. The employment of the transmitter frequency modulation signal as part of the cancellation modulation signals reduces cancellation error resulting from differences in frequency dependent delay shift in different transmission paths for the interfering signal and the cancellation signal.

3 Claims, 1 Drawing Figure

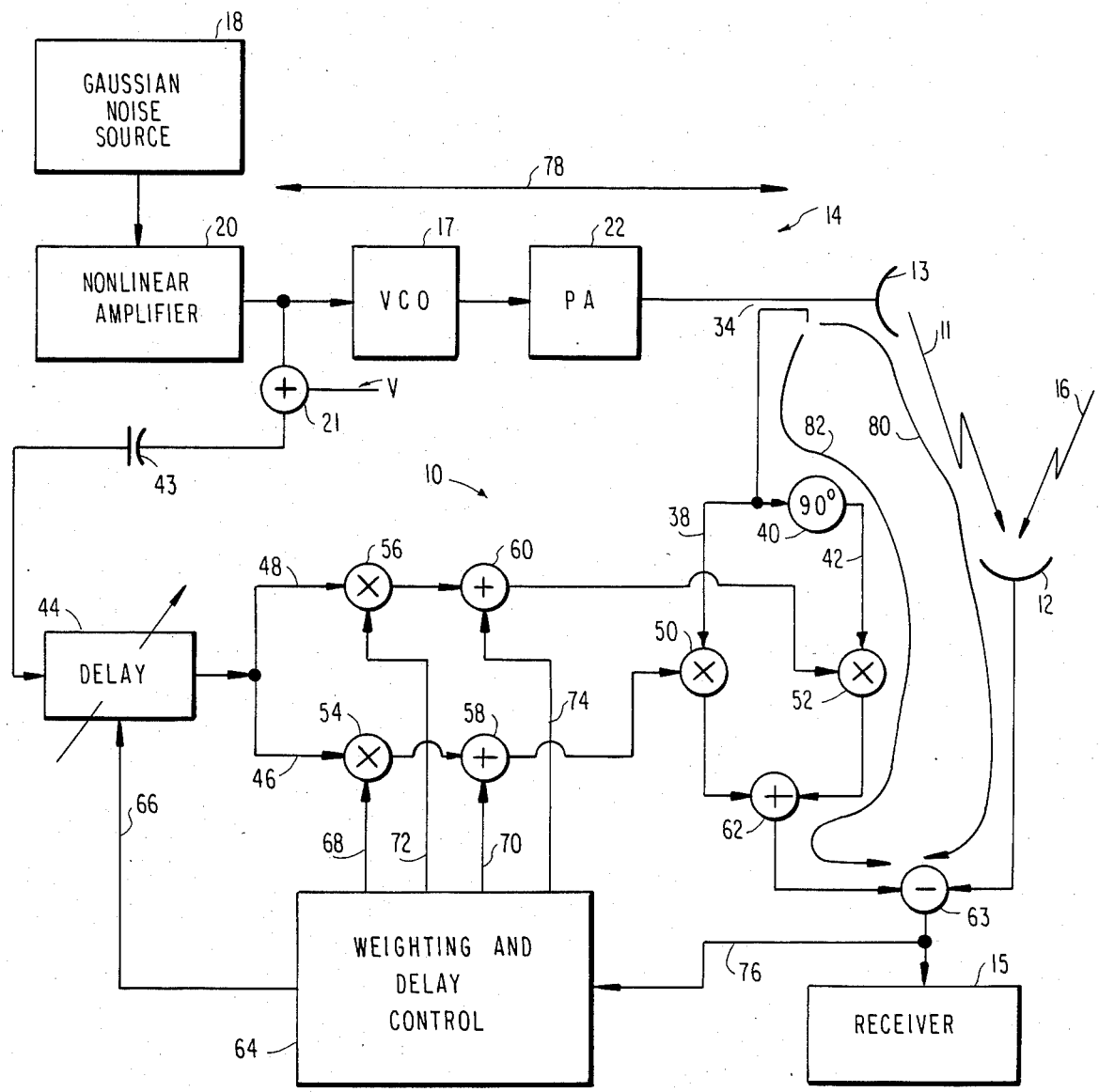

CANCELLATION SYSTEM FOR TRANSMITTER INTERFERENCE WITH NEARBY RECEIVER

STATEMENT OF GOVERNMENT INTEREST

The U.S. Government has rights in this invention pursuant to Contract No. N00123-81-C-0837 awarded by the Department of Navy.

BACKGROUND

1. Field of the Invention

This invention relates to systems for eliminating interference in receiver signals from adjacent transmitters, for example, for eliminating transmitted radar jamming signals from a receiver on an airplane.

2. Description of the Prior Art

In situations where a receiver antenna must be located near to a transmitter antenna, such as on an airplane, the transmitted signal is picked up by the receiver antenna reducing the sensitivity of the receiver. One technique for eliminating the interfering transmitter signal from the receiver is to insert a cancellation signal derived from the transmitter signal into the receiver input with opposite phase to cancel the interfering signal. However, the cancellation signal derived from the transmitter and the interfering signal from the transmitter take different paths through different media, such as free space, wave guide, coaxial cable, etc., and the velocities of propagation in these media do not all vary in the same way as a function of the transmitter frequency. Thus for frequency varying transmitters, the delay of the cancellation signal will not correspond to the delay of the interfering signal for a certain portion of the interfering signal, preventing the cancellation thereof.

SUMMARY OF THE INVENTION

The invention is summarized in a system for cancelling interference in a receiver from a nearby transmitter which is frequency modulated wherein the transmitter modulating signal is utilized with appropriate weighting signals to amplitude modulate a pair of orthogonally related cancellation signals to compensate for unequal frequency dependent delay variation in the cancellation and interfering paths.

An object of the invention is to construct an interference cancellation system for eliminating nearby transmitter signals picked up by a receiver wherein the delay mismatch due to differing propagation media is overcome.

Another object of the invention is to compensate for delay mismatches on a continuous basis as the transmitting operating frequency varies to cancel interfering transmitter signals in a receiver.

One advantage of the invention is that utilization of the transmitter modulating signal to modulate cancellation signals results in substantially improved cancellation of the interfering signal picked up from a transmitter.

Other objects, advantages and features of the invention will be apparent from the following description of the preferred embodiment taken in conjunction with the accompanying drawing.

BRIEF DESCRIPTION OF THE DRAWING

The drawing is a block diagram of an interference cancellation system constructed in accordance with the invention.

DESCRIPTION OF THE PREFERRED EMBODIMENT

As illustrated in the drawing, one embodiment of the invention includes a interference cancellation circuit indicated generally at 10 for cancelling transmitter generated interference signals 11 picked up by a receiver antenna 12 which is near the transmitter antenna 13. The interfering signals 11 are generated by a frequency modulated transmitter, such as a radar or communications jamming signal transmitter indicated generally at 14, and in the absence of the cancellation circuit 10, the interfering signals 11 would substantially interfere with or reduce the sensitivity of a receiver 15 receiving desired signals 16 having a frequency close to the jamming signal frequency.

The jamming transmitter typically includes a voltage controlled oscillator (VCO) 17 which is modulated by a modulation signal derived from a Gaussian noise source 18 amplified by a nonlinear amplifier 20. D.C. voltage is supplied to the VCO input at 21 to set the center frequency of jamming. The output of the VCO 17 is amplified by a power amplifier (PA) 22 which drives the transmitter antenna 13 to radiate the radar or communications jamming signals. In some instances such as on an aircraft, the receiving antenna 12 must be located near to the transmitter antenna 13. The portion 11 of the signals radiated from the transmitter antenna 13 are picked up by the receiver antenna 12 and, if not cancelled, lower the sensitivity of the receiver 15 to receive the desired signals 16 of a near frequency. To overcome this interference, the prior art has coupled a portion of the transmitter signal through another path, i.e. wave guide, coaxial cable, etc. with a delay to the receiver input so as to cancel or subtract the interfering signal; i.e. the cancellation path is selected to produce a delay which results in the cancellation signal being added to the receiver input with a 180° phase shift from the picked up interfering signal to thereby cancel the interfering signal. The delay path is fixed at the transmitter operating frequency. The propagation speed for the transmitted signals varies differently in different medias with different frequencies. For example when the transmitter operating frequency changes, the propagation speed of the signal in a coaxial cable in the cancellation path changes by a different amount than the propagation speed of the signal in the air or space between the transmitting and receiving antennas. Thus when the transmitter frequency is shifted from the carrier frequency, the delay in the cancellation path will no longer result in the cancellation signal being exactly 180° out of phase with the interfering signal.

In accordance with the present invention, the cancellation circuit 10 includes a coupling device 34 for receiving a portion of the transmitter signal. This transmitter signal portion is applied directly to one line 38 while a 90° phase angle shifter 40 shifts the transmitter signal by 90° and applies it to a second line 42; thus lines 38 and 42 conduct cancellation signals which are orthogonally related. The transmitter modulation signal from the nonlinear amplifier 20 is coupled by a blocking capacitor 43 to a variable delay device such as a voltage controlled delay line 44 having its output divided into separate control circuits 46 and 48 to respective modulators 50 and 52 in the respective lines 38 and 42. The circuits 46 and 48 include respective modulators 54 and 56 and respective adding circuits 58 and 60 for controlling the modulators 50 and 52 to control the amplitude of the respective orthogonal cancellation signals in lines 38 and 42. These orthogonal cancellation signals are combined and filtered in the adding circuit 62 to produce a cancellation signal which is then combined with the receiver input signal by the subtractor 63 in the receiver input. The cancellation signal at the subtraction point 63 resulting from the combination of the orthogonal signals in lines 38 and 42 has a phase which is selected by the relative amplitudes of the signals in lines 38 and 42. Since these amplitudes, and thus the phase of the cancellation signal, are modulated by the transmitter modulation signal, the delay in the cancellation signal at the substraction point 63 is varied to compensate for frequency varying differences in delay in the corresponding paths for the cancellation and interference signals.

A control 64 provides D.C. voltages or slowly varying voltages on lines 66, 68, 70, 72 and 74 for controlling the amount of delay, the amplitude, and the average level of the frequency modulation signal transmitted on lines 46 and 48 and controlling the modulators or controls 50 and 52. The signals on lines 66, 68, 70, 72 and 74 are set, either manually or automatically, so as to minimize the average value of the residual jammer interference power coming out of the canceller 63 and delivered to 64 on line 76. For automatically setting the voltages on lines 66, 68, 70, 72 and 74, control 64 will contain some device, such as a rectifier and lowpass smoothing filter, to measure the average power over some selected time interval, as well as some servo mechanism slowly varying the voltages 66, 68, 70, 72 and 74 until minimum power is reached on line 76. For manually setting the voltages, the control may contain a power meter and potentiometers which may be adjusted until a minimum power reading is obtained.

From the transmission signal pickup point 34, the interference signal received by the receiver takes path 80 to the subtraction point 76 while the cancellation signal takes path 82. Although the length of a path similar to 82 could be designed for a single signal to substantially cancel the interfering signal over a small operating frequency range, the interfering and cancellation signals travel over different paths of dissimilar media such as free space, waveguide, coaxial cable, etc. and the velocities of propagation in these media do not all vary in the same way as a function of operating frequency which varies substantially. The present cancellation technique, employing orthogonally related cancellation signals which can be combined in varying proportions to obtain a cancellation signal with a varying phase corresponding to the frequency dependent shift in phase of the interfering signal, substantially overcomes or reduces the problem of different delay shift as a function of the transmitter frequency in the interference and cancellation circuit paths.

It has been determined mathematically that the present cancellation system, under substantially ideal conditions, can provide twice the dB cancellation, less 6dB, that is obtainable from a system which does not employ compensating modulation of the phase of the cancellation signal by the transmitter modulation signal.

Since many modifications, variations and changes in detail may be made to the above described embodiment, it is intended that all matter described in the foregoing description and shown in the accompanying drawings be interpreted as illustrative and not in a limiting sense.

What is claimed is:

1. A system for cancelling interference in a receiver input from a nearby transmitter producing a transmitter signal which is frequency modulated by a transmitter modulation signal, the system comprising:
   a receiving antenna;
   first deriving means for deriving a first signal representative of the transmitted signal;
   cancellation signal means for deriving cancellation signals from said first signal, said cancellation signals comprising second and third signals bearing an orthogonal phase relationship therebetween;
   second deriving means for deriving a fourth signal representative of the modulation associated with said transmitted signal;
   said fourth signal being coupled through variable delay means for incorporating a selectable amount of delay into said fourth signal;
   cancellation modulation signal means for deriving cancellation modulation signals from said fourth signal, said cancellation modulation signal means comprising fifth and sixth signals;
   first and second modulator means;
   second signal and said fifth signal being applied to said first modulator means;
   said third signal and said sixth signal being applied to said second modulator means;
   first adding means for adding the respective outputs of said first and second modulator means;
   subtractor means for subtracting the output of said first adding means and the output of said receiving antenna;
   the output of said subtractor being fed to the input of said receiver.

2. A system for cancelling interference as set forth in claim 1, further comprising:
   sensing means coupled to the output of said subtractor means;
   the output of said sensing means being coupled to said fifth and sixth signals via respective third and fourth modulating means.

3. A system for cancelling interference as set forth in claim 2, wherein:
   a further output of said sensing means is coupled to said variable delay means.

* * * * *